J. Allen.
Setting Mineral Teeth.
No. 442. Reissued Mar. 24. 1857.
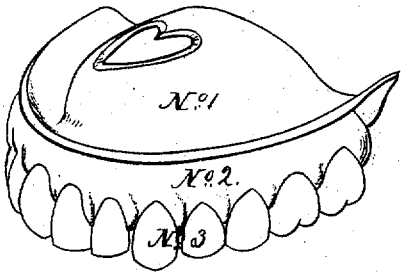

UNITED STATES PATENT OFFICE.

JOHN ALLEN, OF NEW YORK, N. Y.

MODE OF SETTING MINERAL TEETH ON METALLIC PLATES.

Specification forming part of Letters Patent No. 8,621, dated December 23, 1851; Reissue No. 442, dated March 24, 1857.

*To all whom it may concern:*

Be it known that I, JOHN ALLEN, late of the city of Cincinnati and State of Ohio, now of the city, county, and State of New York, have invented a new and useful mode of setting mineral teeth on metallic plates by means of a fusible silicious cement or compound which unites two teeth to such others and to the plates upon which they are set, thus forming a continuous gum; and I do hereby declare that the following is a full and exact description thereof, reference being had to the accompanying drawings, and to the letters of reference marked thereon.

To enable others skilled in the dental art to make and use my invention and improvement, I will proceed to describe the same and its mode of application.

I construct the plates and arrange the teeth thereon in any of the usually approved methods. These plates should be of platinum or such other metal as will not corrode in the mouth or melt at a heat below that which may be necessary to fuse the silicious compound. I then cover the labial surfaces of the teeth with a mixture of plaster-of-paris and asbestus of about equal parts, rendered plastic with water to a suitable consistence, for the purpose of sustaining the teeth in their proper position while they are being baked and soldered to the plate, for the purpose of keeping the teeth in position while applying the body or foundation for the gum color, and also to increase the strength of the piece when finished. The solder to be used should be pure gold or platinum solder. The soldering is most conveniently done in a furnace, and when completed the covering of plaster-of-paris and asbestus is removed. I then apply a silicious cement or compound, the constituent parts of which are hereinafter given, for the purpose of filling up the interstices and uniting the teeth to each other and to the plate upon which they are set when fused, thereby forming a continuous gum. This compound is applied of sufficient thickness to admit of being carved, so as to represent the natural form of the gum without seam or crevice. By thus forming a continuous gum, food and the secretions of the mouth are prevented from lodging in and around the teeth to taint the breath or become otherwise offensive. The piece, being now properly carved, is arranged on a slide, placed in a muffle, and heated up slowly at first, then gradually introduced to a heat of about 2000° Fahrenheit, and is there retained until sufficiently fused. It is then withdrawn, placed in a warm muffle, and cooled off slowly. Should there be any checks in the gum after the first fusing, they should be filled up with the cement and fused again. This done, the gum color should be applied and fused until it presents a bright and shining appearance. The piece should then be carefully withdrawn, placed in a warm muffle, and cooled slowly. The baking process being now completed, it only remains to polish the plate, and it is ready for use.

The combination of mineral substances which I prefer to form the cement or compounds consists, mainly, of the following and in about the following proportions, viz: silex, two ounces; white or fluid glass, two ounces; borax, one ounce; wedgewood, one and one-half ounce; asbestus, two drams; feldspar, two drams; kaolin-clay, one dram, or such equivalents as will produce the same or similar practical results. A yellow tinge may be given to the cement, if desired, by adding one dram of of titanium. All the ingredients above named forming this cement or compound must be well fritted together in a crucible, cooled, and ground fine. To each ounce of this frit add about one-half ounce of wedgewood, or its equivalent, ground fine. The whole mass must be then well mixed and ground together. This admixture or its eqivalent forms the compound or cement to be used upon the teeth and plate, as above.

The gum color mentioned above combines the following ingredients and in about the following proportions, viz: feldspar, one-half ounce; white glass, one ounce; oxide of gold, one and one-half grain. One-half of a grain of rose-red may be added to brighten the color, if desired.

In the accompanying drawings, No. 1 represents the metallic plates; No. 2, the continuous gum; No. 3, the mineral teeth.

What I claim as my invention and improvement, and desire to secure by Letters Patent, is—

A new and useful mode and improvement in setting mineral teeth on metallic plates by means of a fusible mineral compound or cement which is used to fill up the interstices between and around the base of the teeth and upon the plate, of which a continuous artificial gum is formed without seam or crevice.

JOHN ALLEN.

Witnesses:

CHAS. W. NEWTON,
JOHN H. KEYSER.